S. T. CRAPO AND J. R. JENKINS.
CARGO STORAGE FOR BOATS AND UNLOADING MECHANISM THEREFOR.
APPLICATION FILED OCT. 8, 1917.
1,351,026.
Patented Aug. 31, 1920.
3 SHEETS—SHEET 3.
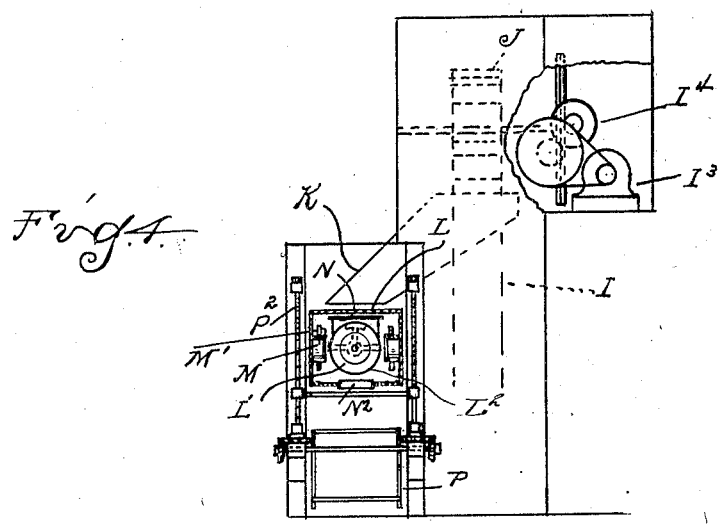
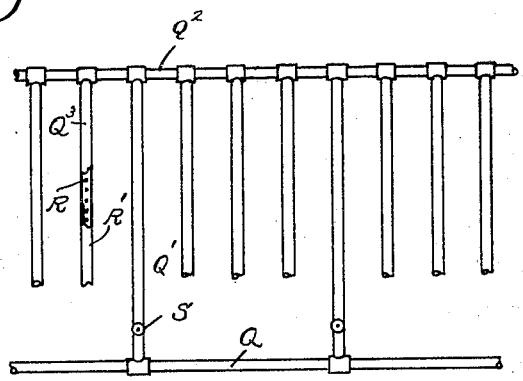
Inventors
Stanford T. Crapo
Joseph R. Jenkins
By Whittemore Hulbert & Whittemore
Attorneys

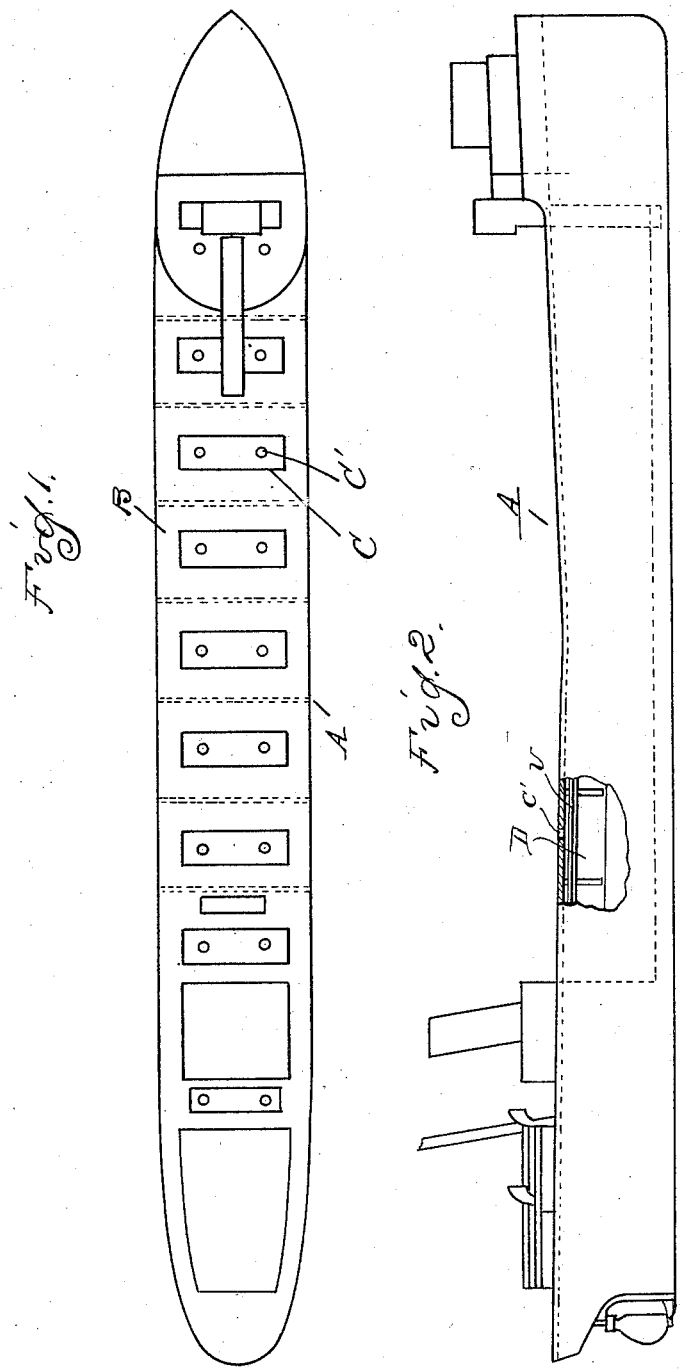

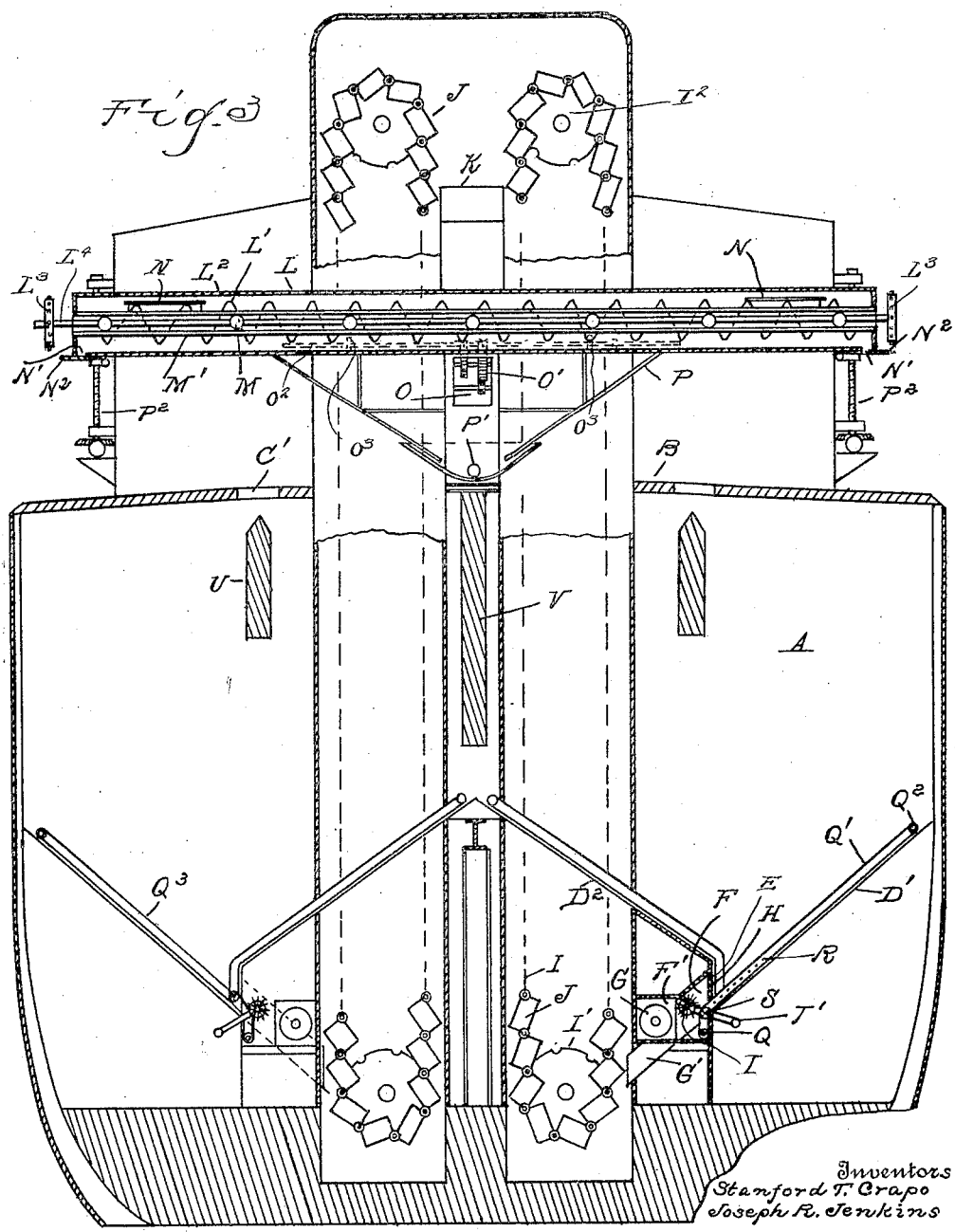

UNITED STATES PATENT OFFICE.

STANFORD T. CRAPO AND JOSEPH R. JENKINS, OF DETROIT, MICHIGAN, ASSIGNORS TO HURON PORTLAND CEMENT COMPANY, OF DETROIT, MICHIGAN, A CORPORATION OF MICHIGAN.

CARGO-STORAGE FOR BOATS AND UNLOADING MECHANISM THEREFOR.

1,351,026.      Specification of Letters Patent.      Patented Aug. 31, 1920.

Application filed October 8, 1917. Serial No. 195,304.

*To all whom it may concern:*

Be it known that we, STANFORD T. CRAPO and JOSEPH R. JENKINS, both citizens of the United States of America, residing at Detroit, in the county of Wayne and State of Michigan, have invented certain new and useful Improvements in Cargo-Storage for Boats and Unloading Mechanism Therefor, of which the following is a specification, reference being had therein to the accompanying drawings.

The invention relates to cargo storage and unloading mechanism therefor and is particularly designed for use in the handling of bulk cement and other materials of a like nature.

In the present state of the art it is usual to ship cement in bags, barrels or other closed packages. Shipment in bulk has not been considered feasible on account of the difficulty in handling and the tendency to form a cloud of dust since the cement is in dry powdered or comminuted form. Thus a storage which is suitable for other materials is not adapted for the holding of cement while unloading devices heretofore employed are equally inapplicable for this material.

It is very essential in unloading a boat to maintain an even keel and especially so when the material is dry powdered or comminuted cement or other like substance in bulk and its discharge is dependent upon gravity. It is also very essential that the rate of discharge from the bins be uniform so that the unloading mechanism will not become inoperative by reason of being clogged. When this cement or similar material is placed into the boat it contains quite an amount of air which during the voyage becomes free so that the material settles in the hold of the boat. This material will not flow evenly and it is difficult to empty the bins entirely.

We have overcome these difficulties by the construction as hereinafter set forth.

In the drawings:

Figure 1 is a plan view of a boat provided with our improved storage and unloading system;

Fig. 2 is a side elevation thereof;

Fig. 3 is a cross section through the hold of the boat showing the arrangement of the storage bins and also the unloading mechanism;

Fig. 4 is an end elevation partly in section of the unloading mechanism above the boat deck; and Fig. 5 is a diagram showing the arrangement of pipes for aerating the cement.

Our improved apparatus may be applied to the hold of any boat but is particularly adapted for use in steel boats, such as shown in the drawings in which A is the hold, B the deck and C the hatches. Within the hold on opposite sides of the plane of the keel are arranged hopper bins D having the bottoms $D'$ and $D^2$, the angles of which are preferably such as to be without the angle of friction so that the material will feed down the same by gravity. The bottom $D'$ is lower than the bottom $D^2$ and is connected therewith by a substantially vertical wall E in which are formed a series of discharge openings connected by chutes F with a longitudinally extending conduit $F'$ inclosing the screw or other conveyer G.

A gate H is provided for each of the discharge openings and the arrangement is such that upon the opening of each gate the material in the hopper will be discharged through the chute F and into the conduit $F'$. The hatch covers C are closed and sealed to prevent escape of dust but each cover is provided with one or more small openings $C'$, preferably two, respectively above the hoppers on opposite sides of the plane of the keel. These openings are adapted to receive the loading conduit by means of which the bulk cement is introduced into the bins and may be distributed to produce a balanced load.

For unloading the material provision is made at one point, preferably in the bow portion for elevating the material discharged by the various chutes F and transferred longitudinally by the conveyer G. This elevating means preferably comprises a pair of endless conveyers I located in a well and on opposite sides of the plane of the keel. Each conveyer is mounted between the sprocket wheels $I'$ and $I^2$, the arrangement being such that the buckets J upon each conveyer pass beneath their respective chutes $G'$ leading from the conduits $F'$ on their upward movement to catch the material being discharged therefrom; raise the material to a suitable height above the boat deck; discharge the material on passing over the sprocket wheel I² into a chute K and then return empty and pass about the lower sprocket wheel I', thereby completing the cycle. The sprocket wheels I² are suitably driven from the motor I³ and intermediate gears I⁴.

For discharging the material from the chute K which is common to and intermediate of the endless conveyers I to bins or receptacles at either side of the boat the screw conveyer L is provided extending directly beneath the lower end of the chute K and transversely of the boat. This screw conveyer comprises the screw L' mounted within the casing L² to opposite sides of which are secured a series of rollers M movable in guides M'. At opposite ends of the casing L² are the inlet openings N provided with suitable covers and the outlet openings N' provided with suitable gates N² for closing the same. The arrangement is such that the screw conveyer L may be shifted longitudinally to either side of the boat so that one of the inlet openings N may be registered with the chute K, the outlet opening N' at the opposite end of the casing L² extending out beyond the side of the boat to permit of the discharge of the material therefrom into the bin or receptacle. The screw L' may be driven in either direction from the reversible motor O by means of the series of intermediate sprocket wheels and chains O' which drive the shaft O². On opposite ends of this shaft are non-rotatably and longitudinally slidably mounted the sprocket wheels O³, each of which is adapted to be alined with and drive its corresponding sprocket wheel L³ mounted at the end of the drive shaft L⁴ for the screw L', when the latter is longitudinally adjusted to either of its outer positions.

For the purpose of adjusting the height of the discharge end of the screw conveyer corresponding to the bin or receptacle at the side of the boat the screw conveyer L and its driving motor O are mounted on the frame P pivotally mounted upon the boat deck at P' in the plane of the keel and suitable adjusting screws P² are provided at opposite ends of the frame to raise and lower the same. The unloading mechanism above the deck of the boat is completely housed so that the cloud of dust about the boat is avoided.

In order to properly unload the boat and to maintain the stability of the same it is absolutely necessary to keep the vessel on an even keel. If the vessel lists, the angles of the hopper bottoms change and one bottom becomes more horizontal so that the cement flows more slowly thereover while the other bottom becomes more vertical so that the cement flows more rapidly thereover with the result that the boat has a constantly and progressively increasing list. Under these conditions a big sudden slide of the cement may occur which would jeopardize the stability of the boat itself resulting in the capsizing of or the striking of the dock by the same.

For the purpose of obtaining a free and uniform flow of the dry powdered or comminuted cement or like material from the bins the following arrangement is provided: Means for aerating the material by sections within the hold, means for controlling the aerating, and uniformly movable means controlling the rate of flow of the material. Since the material is of dry powdered or comminuted form, the air forced thereinto is entrapped and makes the material fluffy and fluid-like, so that it will readily flow. In detail Q represents the air mains leading longitudinally of the hold A; Q' the series of risers leading to the series of headers Q² at the upper edges of the bottoms D' and D²; and Q³ the series of pipes leading downward from each header Q². The pipes Q³ and the headers Q² are closed at their outer ends and all the pipes Q' Q² and Q³ are provided with the spaced holes R within the bins for the exit of the air. To prevent the material from entering through these holes the canvas or other fabric sleeve R' for the pipes is provided which further distributes the air. The valve S is further provided for each riser Q² to control the flow of compressed air thereto. T represents rotary feeders located in the chutes F and driven by suitable means from the shafts T' extending longitudinally of the hold A.

In operation the dry powdered or comminuted cement or similar material in bulk is loaded by successively introducing the loading chute or conveyer into the feed openings C' in the hatch covers, said openings being closed by suitable caps when not in use. As the storage bins are completely inclosed there is no opportunity for the dust to escape and by reason of the shape of the bins all material lodging therein will eventually be fed to the discharge chutes F of the hopper-shaped bottom. The bins being upon opposite sides of the keel will maintain a balanced load.

For the purpose of preventing any shifting of the load by the transverse pitching or rocking of the boat, the partition walls U and V extending longitudinally of the boat hold and secured to the boat deck and depending therefrom are provided. The partition walls U are located substantially centrally beneath the longitudinal series of feed opening C' and are spaced from the deck sufficiently to permit of the insertion of the loading chute or conveyer into the feed openings and to deflect the material to each side of the series of bins. The partition wall V extends directly to the boat deck. To permit of the free flow of the material into the discharge openings, the partition walls U and V are spaced from the bin bottoms, the bottom of the wall V being a comparatively slight distance from the bin bottoms. The partitions or bulk heads extending transverse of the hold of the boat to brace the sides thereof prevent any shifting of the load by the forward pitching of the boat. Thus it is seen that the load is maintained in its position within the hold.

In unloading, the bins may be successively discharged by opening the gate H and the air valves S which will permit the dry powdered or comminuted material which has been charged with air to be discharged by gravity into the conveyer housing F' and to be fed longitudinally of the boat by the screw conveyer G. This conveyer in turn will discharge the material to the endless conveyer I which discharges the material into the screw conveyer L, which is adapted to discharge the material to either side of the boat, simply by shifting the latter conveyer and properly adjusting the motor. In this manner the whole cargo may be rapidly unloaded without exposure or the escape of dust.

From the above it may be readily seen that a simple efficient construction is provided for loading, transporting and unloading dry powdered or comminuted cement or like material in bulk. Also means is provided for aerating this cement to any desired degree to make the same flow freely and other means is provided for controlling the aerating to control the flow of cement from the several bins independently so that the cement may be discharged equally from the bins on opposite sides of the plane through the keel of the boat whereby all lists are prevented.

What we claim as our invention is:

1. In a boat, a hold for containing dry comminuted material, a discharge spout therefor, a series of pipes adjacent to the bottom of said hold having a plurality of spaced holes for the exit of air, and a fabric covering for said pipes.

2. In a boat, the combination with bins arranged upon opposite sides of the keel of the boat for containing dry comminuted material, said bins having hopper-shaped bottoms, discharge openings for the material at the bottoms of said bins and separately controlled means for charging with air the material in each bin.

3. In a boat, the combination with a series of bins arranged upon opposite sides of the boat for containing dry comminuted material, said bins being provided with hopper-shaped bottoms, discharge chutes for the material at the bottoms of said bins, means for charging with air the material within said bins to facilitate the uniform gravity flow of the same and means for regulating the rate of discharge of the material through said discharge chutes.

4. In a boat, the combination with a series of longitudinally arranged bins upon opposite sides of the keel of the boat for containing dry comminuted material, said bins having hopper-shaped bottoms, discharge chutes at the bottoms of said bins and a plurality of pipes adjacent said hopper-shaped bottoms of each bin having holes therein, said pipes adapted for the passage of air under pressure, and a separate valve for controlling the pipes for each bin.

5. The process of unloading dry comminuted material from bins arranged upon opposite sides of the keel of a boat, comprising the charging with air of the material in the bins, the feeding of the material from the bins and the controlling of the charging with air to secure a substantially even rate of feed of the material upon opposite sides of the keel.

6. The process of unloading dry comminuted cement from a series of bins arranged on opposite sides of the keel of a boat, comprising the charging with air of the cement in the bins, the feeding of the cement from the bins by gravity, and the controlling of the charging to secure an even rate of flow of the cement upon opposite sides of the keel, and the controlling of the rate of flow of the cement from the bins.

In testimony whereof we affix our signatures in presence of two witnesses.

STANFORD T. CRAPO.
JOSEPH R. JENKINS.

Witnesses:
E. STRINGER,
A. B. RUHLY.